United States Patent [19]

Bacus

[11] Patent Number: 5,235,522
[45] Date of Patent: Aug. 10, 1993

[54] METHOD AND APPARATUS FOR AUTOMATED ANALYSIS OF BIOLOGICAL SPECIMENS

[75] Inventor: James W. Bacus, Hinsdale, Ill.

[73] Assignee: Cell Analysis Systems, Inc., Elmhurst, Ill.

[21] Appl. No.: 595,117

[22] Filed: Oct. 10, 1990

[51] Int. Cl.⁵ .......................... G06K 9/00; G06F 15/00
[52] U.S. Cl. ...................................... 364/497; 356/39; 364/413.1; 382/6
[58] Field of Search ........... 364/496, 497, 555, 413.08, 364/413.1, 413.13, 413.02; 436/10, 63; 377/3.6; 382/6; 356/39

[56] References Cited

U.S. PATENT DOCUMENTS

| | | | |
|---|---|---|---|
| 3,833,796 | 9/1974 | Fetner et al. | 364/413.1 |
| 4,097,845 | 6/1978 | Bacus | 364/413.08 X |
| 4,125,828 | 11/1978 | Resnick et al. | 364/413.08 X |
| 4,199,748 | 4/1986 | Bacus | 364/413.08 X |
| 4,404,683 | 9/1983 | Kobayashi et al. | 364/413.08 X |
| 4,523,278 | 6/1985 | Reinhardt et al. | 364/413.1 |
| 4,656,594 | 4/1987 | Ledley | 364/413.1 X |
| 4,661,913 | 4/1987 | Wu et al. | 364/555 X |
| 4,741,043 | 4/1988 | Bacus | 364/413.13 X |
| 4,833,629 | 5/1989 | Moore | 364/555 |
| 4,987,539 | 1/1991 | Moore et al. | 364/555 X |
| 5,018,209 | 5/1991 | Bacus | 364/413.08 |
| 5,023,785 | 6/1991 | Adrion et al. | 364/413.08 |

*Primary Examiner*—Kevin J. Teska
*Attorney, Agent, or Firm*—Fitch, Even, Tabin & Flannery

[57] ABSTRACT

An apparatus and method for analyzing the cell objects of a cell sample for the diagnosis and treatment of actual or suspected cancer is disclosed. An image of the cell sample is first digitized and morphological attributes, including area and DNA mass of the cell objects are automatically measured from the digitized image. The measured attributes are compared to ranges of attribute values which are preestablished to select particular cell objects having value in cancer analysis. After the selection of cell objects, the image is displayed to an operator and indicia of selection is displayed with each selected cell object. The operator then reviews the automatically selected cell objects, with the benefit of the measured cell object attribute values and accepts or changes the automatic selection of cell objects. In a preferred embodiment, each selected cell object is assigned to one of six classes and the indicia of selection consists of indicia of the class into which the associated cell object has been placed. The measured DNA mass of identified cell object fragments in tissue section samples may also be increased to represent the DNA mass of the whole cell object from which the fragment was sectioned.

27 Claims, 5 Drawing Sheets

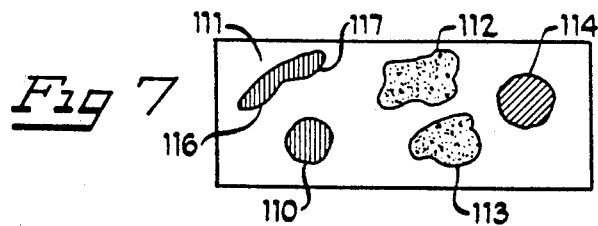
Fig 7
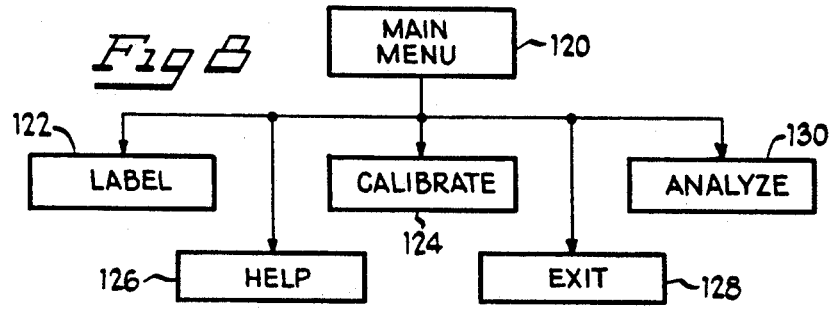
Fig 8
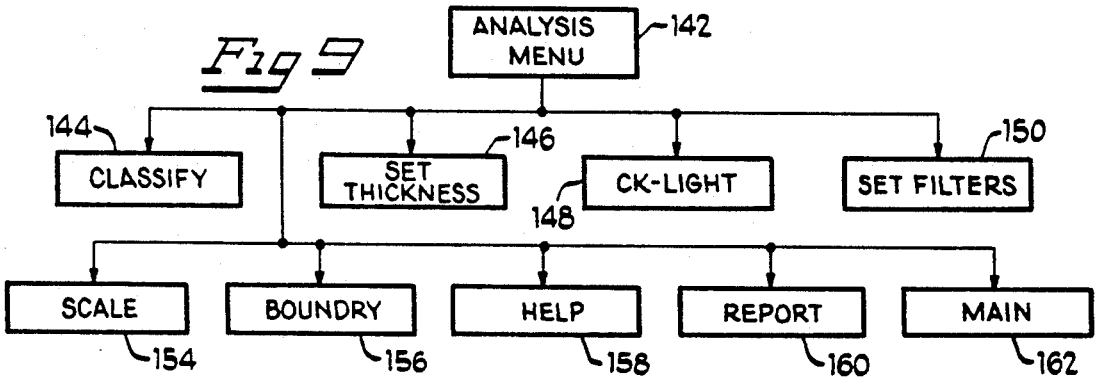
Fig 9
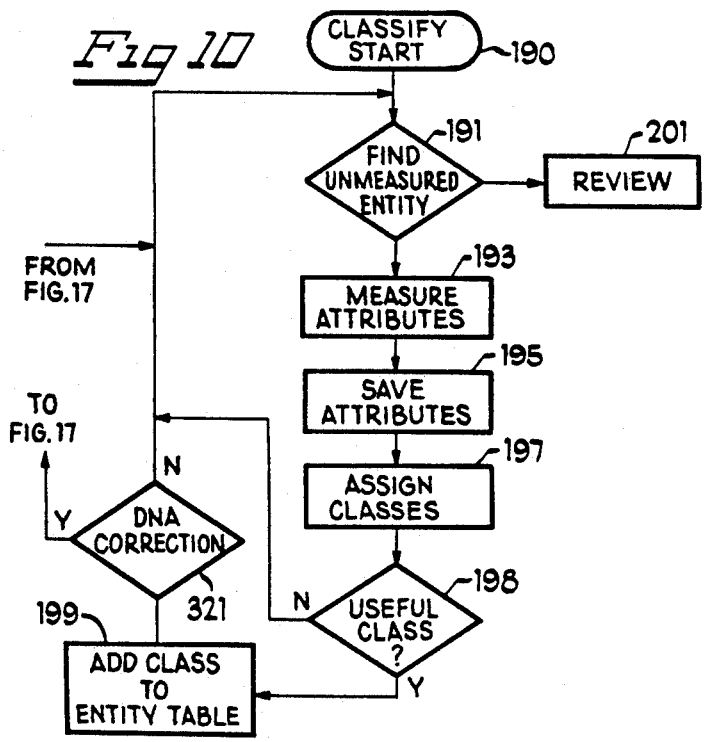
Fig 10
Fig 11
OPTICAL ENTITY TABLE
| AREA |
| SHAPE |
| CLASS |
| DNA MASS |
| DENSITY |
| PERIMETER |
| LOCATION |

METHOD AND APPARATUS FOR AUTOMATED ANALYSIS OF BIOLOGICAL SPECIMENS

BACKGROUND OF THE INVENTION

This invention relates to a system for performing an assay of a biological cell sample, and more particularly, for providing an automated method and arrangement of measuring attributes of the cells of the sample and classifying sampled cells in accordance with the measured attributes.

The diagnosis/prognosis of a possible cancer typically includes the removal of a cell sample, such as a tissue mass, from the patient. Although an attending physician may have good intuition regarding the patient's diagnosis/prognosis, confirmation of the diagnosis with a histological examination of the cell sample removed from the patient is necessary. The histological examination entails cell staining procedures which allow the morphological features of the cells to be seen relatively easily in a light microscope. A pathologist, after having examined the stained cell sample, makes a qualitative determination of the state of the tissue and reaches a conclusion regarding the prognosis for the patient. While this diagnostic method has a long history, it is somewhat lacking in scientific rigor since it is heavily reliant on the subjective judgment of the pathologist and it is extremely time consuming.

The optical evaluation of cell samples, and particularly those taken from tissue sections, is a difficult procedure. The optical field presented to an evaluator is a disordered collection of cell objects, some on top of one another and others being only fragments of whole cell objects. The optical field shows only boundaries of two-dimensional optical entities filled with varying levels of contrast. Some of the overlapped cell objects appear to be large and/or dense single cell objects and some of the cell object fragments appear to have sufficient size to be whole cell objects. Faced with this random cluster of images, the evaluator's difficult and time-consuming task is the selection of single whole cell objects which can accurately represent the cell sample and the classification of those selected objects into categories which classification aids in the final diagnosis/prognosis.

It is well known that the DNA content of cell objects can provide valuable information in cancer diagnosis. Systems have been developed which utilize the DNA content of cell objects to improve histological examination. In U.S. Pat. No. 4,471,043 to Bacus for Method and Apparatus for Image Analyses of Biological Specimens, an automated method and a system for measuring the DNA of cells are disclosed which employ differential staining of the DNA in cell nuclei with a Feulgen stain and image processing. After staining, optical fields of the cell sample are presented to an evaluator who selects objects for analysis and categorizes the selected objects. Certain attributes including the DNA mass of the operator selected cell objects are then measured and used to produce reports such as DNA histograms.

The arrangement and method of Bacus U.S. Pat. No. 4,471,043 have been well received both for the reports generated and for the improvements in the use of operator time. The operator, however, must still select relevant cell objects from the optical field presented and classify the selected cell objects into classes before machine measurement of attributes occurs. Such selection and classification requires the thoughtful review of each object in the random cluster of images of an observed field. Further, the only input information available for such review is the varying contrast levels presented by the visual image. When the operator must evaluate cell samples for a long period of time, as is the case in some pathology laboratories, concentration by the operator and accuracy of the decisions made, may be affected.

A need exists for an automated method and arrangement for use with a DNA analysis apparatus, which selects whole, single cell objects and classifies each selected cell object as being in a particular one of a plurality of diagnostic aiding categories as well as in particular regions of the DNA distribution. The automatic selection and classification of cell objects speeds analysis and reduces the tedium of the operator. Also, pre-selection and classification by the apparatus permits the operator to concentrate his or her efforts on the difficult and subtle analysis of the preselected cell objects which are likely to be representative of the sample.

The evaluation of cell objects and their accurate reporting is at its most difficult when a sample is taken from a tissue section. The act of slicing the tissue section also slices and distorts some of the cell objects which are to be observed and analyzed. The viewed field of a tissue section sample contains many small cell object fragments which have almost no analysis value, but must be evaluated by the observer. Other fragments are substantial parts of cell objects, which due to size or optical density, will be selected and reported as whole cell objects. When reports such as DNA histograms are prepared, a selected fragment consisting of 75% of a whole cell object will be counted as a whole cell object having approximately 75% of the DNA contained by the original (pre-sliced) cell object. Thus, the histogram will include a cell object having smaller DNA mass value than should have been reported. Greater report accuracy can be achieved when the cell object attributes such as DNA mass of fractional cell objects can be corrected to represent whole cell objects before those attributes are used in preparing the final reports.

A need exists for evaluation methods and apparatus which identify cell object fragments likely to possess analysis value and properly correct their measured attributes to reflect what those attributes would have been, had the identified cell object not been fragmented.

SUMMARY OF THE INVENTION

The present invention provides a method and apparatus for automatically measuring on a per cell object basis the DNA mass and other morphological characteristics of the cell objects in a cell sample and automatically classifying each analyzed cell object based on the measured characteristics. The DNA mass and the other morphological attributes measured are compared with predetermined standard ranges to select single, whole cell objects and determine the class of the cell objects being analyzed. Both the DNA mass and cell class are displayed in an associated manner, and both are used in the preparation of final reports. The present invention also provides a method for increasing the measured DNA mass value of identified cell object fragments from tissue section samples to more accurately represent the DNA mass of the whole cell object from which the fragment was sectioned.

In accordance with the present invention, a method of analyzing the cell objects of a cell sample includes automatically measuring predetermined attributes, including the DNA mass, of the cell objects and automatically classifying selected ones of the cell objects into one of a plurality of mutually exclusive categories. An image of the cell objects is then displayed in association with their assigned class to an operator for human review. The operator is enabled to change the classification of any displayed cell object and to "deselect" automatically selected cell objects. As an aid to the operator's review of the cell objects, the automatically measured attributes are displayed to the operator during review. In an embodiment, the cell objects of interest are cell nuclei and the automatically measured attributes of the cell objects, which remain selected or are newly selected by the operator during the review, are used to generate reports such as the DNA histograms.

The automatic attribute measurement and automatic selection and classification of cell objects rapidly produces a first accurate screening of the cell objects, removing much operator time and tedium from the analysis. The apparatus, in essence, automatically selects cell objects which are likely to have value in the assessment of possible cancers. The display of cell objects to the operator, along with their automatically assigned class, permits the operator to exercise seasoned judgement in the selection and classification operation and to change the automatically determined selection and classification. At the completion of the operator's review, the cell objects remaining selected and in classes are likely to be more accurate than those produced by the operator alone, since the determinations are made on the basis of quantitative apparatus selection and qualitative operator review.

The automatic selection of cell objects from a cell sample and their classification is based on a set of filters, each comprising a group of cell object attribute value ranges. In a preferred embodiment, value ranges are established for the following cell object attributes: area, perimeter, DNA mass and shape. The value ranges for the filters are dependent on the type of analysis to be performed and are established by the operator prior to the actual analysis of cells. In an exemplary embodiment, the attribute range values for prostate tissue sections are disclosed.

Up to six different filters are established for a given analysis, each filter being used to select one class of cell objects having a preestablished set of value ranges. The definition of what each class represents is left to the individual establishing the attribute value ranges. The definitions of the six ranges in an exemplary embodiment for analyzing prostate tissue sections are diploid, large diploid, irregular diploid, S-phase, tetraploid and massive DNA.

After the filter value ranges are established, an image of a field of the cell sample is digitized and the attributes of the cell objects of the digitized image are measured by the apparatus. The measured attributes are then compared with the stored filter-defining attribute value ranges to determine if a cell object observed in the image meets the definition of a class as established by the filter for that class. When a cell object is within the value ranges of a filter, the cell object is said to be selected and it is assigned to the class into which it falls. Alternatively, when a cell does not fall within any class it is said to be not selected.

Upon the completion of automatic attribute measurement and class assignment, a representation of the cell sample image is displayed to the operator. The cell objects which were assigned a class are displayed in association with indicia of that assigned class. In a preferred embodiment, each class of cell object is assigned a unique color and each cell object in a class is displayed with a perimeter having the unique color of its class. Surrounding classified cell objects with the color of the class assigned thereto, notifies the operator of the class of the cell object but does not obscure the cell object from the operator's view.

In a review phase of the cell analysis, the operator surveys the classified, displayed cell objects to determine if any assigned class should be changed or if a classified cell object should have its class removed. A computer mouse is used to move a cursor to a displayed cell object of interest and the cell object can be chosen for review by pressing a mouse key. Upon choosing a cell object for review, the measured attributes of that cell object are displayed so that the operator can see the qualitative attributes of that cell object. Based on the cell object display and the displayed attributes, the operator can change the class of the chosen cell object and thereby change its enhanced perimeter. When the cell objects selected and their assigned classes agree with the operator's opinion, the field can be approved. The measured attributes of the cell objects which remain in a class after the review phase are used to generate reports such as DNA mass histograms.

Cell object samples taken from tissue sections may include cell object fragments which are selected and reported as whole cell objects while their DNA mass is less than the DNA mass of the cell object from which the fragment was sectioned. With the present invention, the measured DNA mass of such fragments can be corrected (increased) to reflect the DNA mass of their source whole cell object. After the automatic measurement of cell object attributes, cell object fragments which are likely to have analysis value are identified from their measured attributes and the cell object attributes are corrected to reflect the attributes of the whole cell objects from which the fragment was sectioned.

In a preferred embodiment, the valuable cell object fragments are identified by comparing the measured cell object area with a threshold value determined from the known thickness of a tissue section from which the sample was taken. If the measured cell object area is larger than the threshold, the cell object is identified for correction since it is too large to be entirely included within the tissue section. A correction value is then determined from the measured area and the tissue section thickness and used to increase the measured DNA mass of the identified cell object fragment.

In an embodiment of the invention, the correction value C is determined from the equation:

$$C = \frac{3T}{4R} - \frac{T^3}{16R^3}$$

where T is the tissue section thickness and R equals the square root of the measured area divided by $\pi$. The formula yields a correction value between 0 and 1 for identified cell objects, which value is divided into the measured DNA mass of the cell object to increase the DNA mass to a corrected value representing the whole cell object. The correction values can be calculated and the division performed as each identified cell object is classified, or it can be applied to a stored list of measured cell objects selected from the filter process discussed above. Also, a correction value look up table can also be created before analysis begins. Such a correction value table stores predetermined calculation results from various combinations of tissue section thickness and measured cell object area. Similarly, the correction value table can be populated with correction values empirically determined from studies of tissue section cell object samples.

The DNA mass correction function can be performed before cell objects are selected and classified for reports, or after such selection and classification.

BRIEF DESCRIPTION OF THE DRAWINGS

FIGS. 3-6 are DNA histograms produced by the apparatus of FIG. 1;

FIG. 7 is a representation of an optical field of a cell sample;

FIG. 8 is a pictorial representation of the main menu options of FIG. 1;

FIG. 9 is a pictorial representation of the analyze function of FIG. 8;

FIG. 10 is a flow diagram of the classify function shown in FIG. 9;

FIG. 11 is a representation of an optical entity table stored for each optical entity of an observed sample;

DETAILED DESCRIPTION OF THE PREFERRED EMBODIMENT

Figure 1:
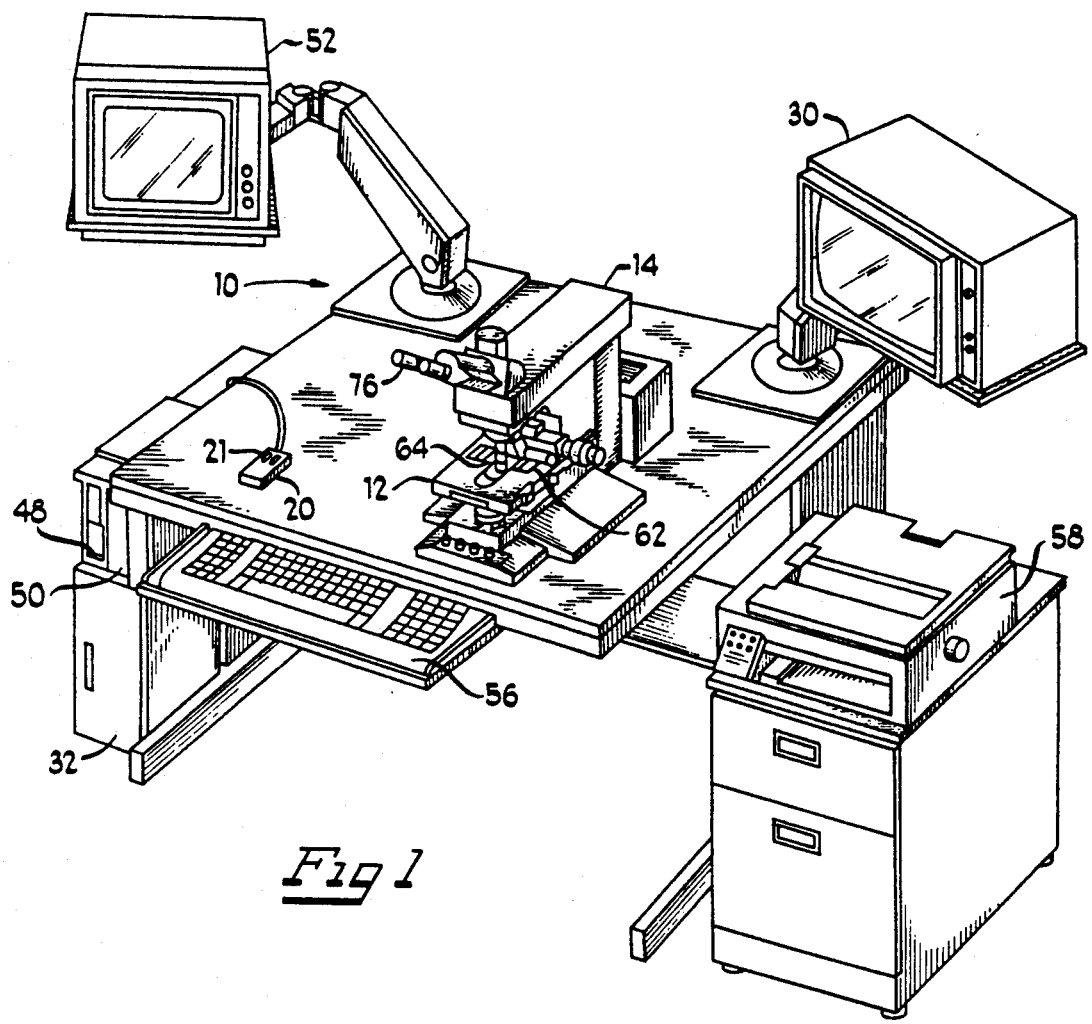
FIG. 1 is an isometric view of an apparatus embodying the present invention for analyzing cell samples.

As shown in the drawings and described herein, the invention is embodied in a method and apparatus for automatically analyzing "cell objects" which term is used to be generic to cells such as cells taken from tumors or the like, and which are checked for their DNA content and also to be generic to non-biological objects such as plastic or glass spheres. In the disclosed embodiment, the cell objects of interest are cell nuclei. By way of example, the present invention is useful for study not only of ploidy analysis but also can be used to analyze Pap smear cells, monoclonol antibodies and other infectious diseases which can be diagnosed by DNA probes.

The Preferred Embodiment described herein is used to analyze tissue section biological specimens which are examined on a microscope slide. The principles taught however relate also to other sample collection methods such as cell aspiration and to other means for examining cells such as a flow cytometer.

The present invention speeds up cell analysis by improving the level of automation and providing new and valuable information to the medical expert responsible for diagnosis/prognosis. To illustrate the importance of accurate cell object selection for analysis by the present apparatus, reference is directed to FIGS. 3 through 6. FIG. 3 shows a normal DNA mass histogram having cell number (count) versus mass distribution for healthy, non-dividing cells. The number of cells is provided on the ordinate axis and their DNA nuclear mass on the abscissa. The cell population shown in FIG. 3 is not dividing and the DNA content peaks around a normal peak $G_0/G_1$ which is the diploid DNA amount of 7.18 picograms per cell. This relative mass of DNA is labelled as 1 to normalize the abscissa of the histogram. FIG. 4 shows a normal cell population which is dividing as is shown by the significant $G_0/G_1$ peak at 1 and a second peak $G_2$ at 2 (14.36 picograms per cell). The peak at 2 is normal, because some of the cells are in division and have double the normal diploid amount of DNA. The saddle S between the two peaks represents cells which are in various stages of DNA replication.

Figure 5:
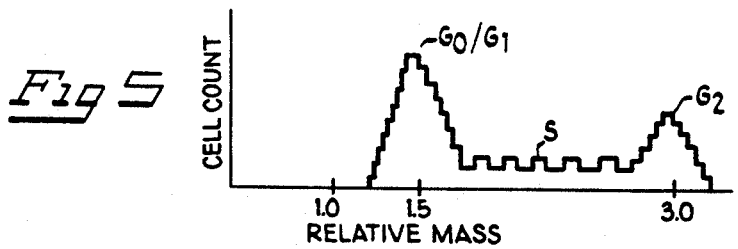
Figure 6:
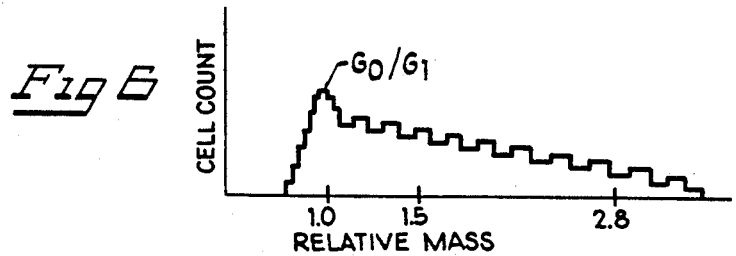

Comparing the histogram of FIG. 5 with those of FIGS. 3 and 4, it is seen that this cell population is skewed from normal having a first peak around 1.5 and the second peak around 3. This histogram may show a malignancy because of the abnormally high DNA content of many of the cells. This high DNA content is likely indicative of the increased chromosome content of malignant cells. Similarly, in FIG. 6 it is shown that the first peak occurs at 1 indicating the normal diploid amount of DNA, but has a relatively large trailing saddle from 1 to 2.8. A normal second peak is not shown in FIG. 6. The shape of the FIG. 6 histogram is likely due to abnormal DNA amounts in cells and clones of cells indicative of malignancy. The analysis of FIGS. 5 and 6 is a difficult task because the particular classes of cells which make up each mass range of the histogram can be important to analysis, but can only be surmised from the data provided by the histogram. The disclosed embodiment automatically determines a cell class from measured DNA content and other morphological features of cell objects and provides this cell category information to the expert as an aid to his or her analysis.

The DNA histograms of the type shown in FIGS. 3 through 6 are extremely valuable in the histological evaluation of both suspected and actual cancers. Given their value, it is important that the data from which the histograms are generated is accurate and can be produced at a reasonable cost so that these techniques are widely available.

FIG. 7 is a representation of a portion of a disordered collection of cell objects as seen in an optical image of a cell sample. The representation of FIG. 7 includes five optical entities numbered 110 through 114. An optical entity, in this description, is a viewable item having a common boundary filled with levels of contrast so that it can be distinguished from the image background. An optical entity may comprise a single cell object fragment, a single whole cell object or overlapped combinations of whole and fragmentary cell objects. The cell object fragments are particularly prevalent in cell samples taken from sectioned tissue where the slicing necessary to prepare the section cuts many cell objects into fragments. The optical entities of FIG. 7 are made up of whole cell nuclei and fragments of cell nuclei. When these optical entities are to be evaluated manually, an evaluator selects which of the optical entities should be included in the final tabulation such as the histograms of FIGS. 3 through 6.

Entity 110 is relatively round and appears to have sufficient density (contrast) to be a whole single cell object, and will probably be selected for analysis as a diploid cell by the evaluator. Entity 111 may be interpreted as a single elongated cell object of sufficient density for evaluation, however, it may actually be two cell objects 116 and 117, lying partially one on top of the other, to give the appearance of a single cell object Should the evaluator select entity 111 as a single cell object, when in fact it is two cell objects, the data will show a single cell object (a count of one on the histogram) which has a DNA mass of approximately twice the diploid amount. Thus, the selection of optical entity 111 may result in incorrect data. Similarly, entity 113 may be interpreted as two overlapping cell objects and not counted by an evaluator. However, entity 113 may be a deformed tetraploid cell object in which case, the selection of optical entity 113 would be valuable to a final report. It can be seen from FIG. 7, that the selection of cell objects which are likely to provide accurate analysis information is a difficult task when only the optical image is available. The present invention automates cell sample evaluation including cell object selection and classification by the apparatus shown in FIGS. 1 and 2, functioning in accordance with new operational methods.

Figure 2:
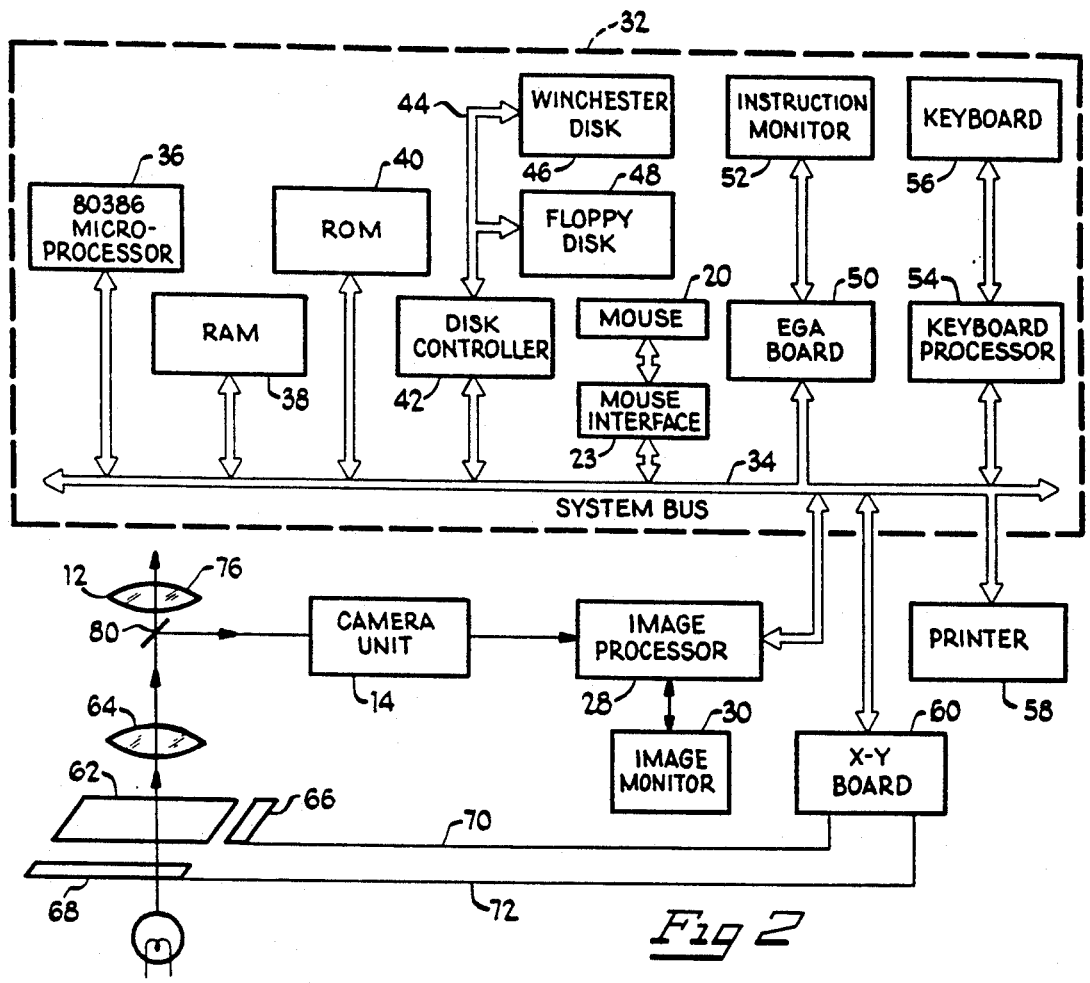
FIG. 2 is a block diagram of the apparatus of FIG. 1.

In the implementation shown in FIGS. 1 and 2, the system is a computerized image analysis apparatus designed to measure a number of cell object features and parameters from their image on a typical glass slide. The apparatus includes a sophisticated digital image processing system which performs quantitative analysis on individual cells for nuclear DNA content as well as measurement of other nuclear features.

FIG. 1 shows an apparatus embodying the present invention which is generally identified by a numeral 10. Apparatus 10 comprises an optical microscope 12 which may be any conventional type, but in this embodiment is a Riechart Diastar. An optical camera module 14 is mounted on the microscope 12 to enhance optically a magnified image of a cell sample viewed with microscope 12. The optical camera module 14 includes at least one television camera which generates a standard NTSC compatible signal representative of the field of view of microscope 12. An image processing system 28 (FIG. 2) is connected to the camera module 14 to receive the NTSC signal and to store a cell object pixel array therein. The image processor 28 is connected to a computer 32 which in the present embodiment, is an INTEL 301, Model 386 computer, for the processing of the pixel array.

Computer 32 which is shown in greater detail in FIG. 2 includes a system bus 34 connected to the image processor 28. An 80386 microprocessor 36 is connected to the system bus 34. A random access memory 38 and a read-only memory 42 are also connected to system bus 34 for the storage and information. A disk controller 40 is connected to the system bus 34 and by a local bus 44 to a Winchester disk drive 46 and to a floppy disk drive 48 for secondary information storage. A video conversion board 50, in this embodiment an EGA board having 256 K bytes of memory, is connected to the system bus 34 to control an instruction monitor 52 connected to the EGA board 50. A keyboard processor 54 is connected to system bus 34 to interpret signals from a keyboard 56. An interactive computer mouse 20 is also connected to bus 34 via a mouse interface 23. A printer 58 is connected to the system bus 34 for generating paper copies of information generated by computer 32.

An X-Y image field board 60 is connected to the system bus 34 and to a slide holder of the microscope 12 to sense the relative position of slide 62 with respect to a microscope objective 64. Included is a Y position sensor 66 and an X position sensor 68. The Y position sensor 66 is connected via a communication path 70 to the X-Y board 60 and the X position sensor 68 is connected via a communication path 72 to the X-Y board 60. The microscope 12 also includes an eye piece 76, in optical alignment with the objective 64 for the magnification of light forming the image of a cell sample on slide 62.

When using the apparatus 10, a pathologist first collects a cell sample which may be in the form of a tissue section made from frozen or paraffinized prostate tissue. Such a cell sample will include both whole cell nuclei and cell nuclei fragments, both of which are referred to as cell objects herein. Alternatively, the cell sample may be a cell preparation of the type taken by aspirating the contents of a cyst or tumor. The cells of the cell sample are placed on slide 62 and fixed thereon. The fixed cell sample is then prepared by, for example, the Feulgen staining technique to enhance cell object features.

The microscope slide 62 is then placed on the carrying stage of microscope 12 and the objective 64 is focused thereon. A portion of the light from the objective 64 travels through a beam splitting mirror 80 to eye piece 12 where it may be viewed by an observer. The beam splitting mirror 80 conveys the remainder of the light from objective 64 to camera module 14, which generates an NTSC signal representing the image and applies that signal to image processor 28. Image processor 28 digitizes the image received from camera unit 14 and stores the digitized image in a frame buffer of the image processor. The contents of the frame buffer are presented to an image monitor 30, which displays a field of the cell sample. The digitized image field is also presented to computer 32 over system bus 34 for analysis thereof.

When the apparatus is in operation, the operator has a number of options or functions which can be chosen to acquire and process data from a cell sample. In general, the program setting forth the functions is menu driven and provides on instruction monitor 52 a main menu of options as shown in FIG. 8. The main menu 120 consists of five main screen functions including a label function 122, a calibrate function 124, a help function 126, an exit function 128 and an analyze function 130. A function is selected from the menu of FIG. 8, as well as other menus presented to the operator, by operator interaction with mouse 20. The menus are presented on instruction monitor 52 to the operator who moves a cursor thereon by means of mouse 20 and selects a desired function by pressing a mouse button e.g., 21 when the cursor is on the desired function. Mouse interactive menu selection is well known in the art.

The label function 122 allows a user to enter information regarding the patient identification, accession number, and a DNA conversion number. The DNA conversion number is the expected DNA mass for a diploid cell. Initially, the DNA conversion number is set by default to a standard 7.18 picograms for normal human cells. However, the apparatus may be used to measure non-human cells and the index may be changed to the number desired. The DNA index number must be set to a value greater than or equal to 1 and less than or equal to 99.99.

Selection of the calibrate function 124 permits the proper adjustment of the apparatus to assure accurate measurements. In the calibrate function 124 light levels are compared to known standard light levels for appropriate adjustment and the DNA mass of a number of standard cells is determined so that the DNA mass of the cell objects in the cell sample can be accurately determined. The calibration of apparatus of the type shown in FIG. 1 is described in detail in U.S. Pat. No. 4,741,043 to Bacus.

The help function 126 of FIG. 8 provides explanation to the operator to aid in the use of the apparatus 10. The exit function 128 permits the system to leave the present main menu function.

An analysis analyze function 130 is performed to specifically analyze the cell objects of a sampled field of cell objects. The menu 142 for the analyze function is shown in greater detail in FIG. 9. It is in the analysis function of FIG. 9 that actual cell object attributes such as DNA mass are measured and recorded for reporting purposes. The analyze function 130 includes a number of sub-functions which are employed to improve the accuracy of cell object attribute measurement. One sub-function is the check light function 148 which calculates the light level of the current field image to assure accuracy of adjustments. A boundary function 156 allows the operator to set the threshold which must be achieved between the image background and the contrast of an optical entity before that entity is recognized. Scale function 154 permits the adjustment of the horizontal scale of DNA histograms shown on the monitor instruction 52. The set thickness function 146 is used to provide certain DNA mass corrections and is discussed below. The analyze function also includes a help function 158 to provide assistance to the operator and a main function 162 which permits the return to the main menu from the analysis menu 142.

The classify function 144 and set filters function 150 are the two most closely related functions to the actual evaluation and measurement of cell object attributes. The set filters function allows the operator to establish ranges of predetermined measurable parameters which are used to interpret the attributes of cell objects measured in the classify function.

The ranges are set by the operator and define which cell objects will be automatically selected for reporting and what classes of cell objects are to be automatically assigned to the selected cell objects The filter ranges are, as discussed below, compared to automatically measured cell object attributes and cell objects will be selected and classified or not, depending on their similarity to the established ranges. The setting of ranges, the automatic measurement of cell objects and the comparison of measurements and filter ranges, replaces the tedious cell object selection and classification by human operators.

Figure 14:
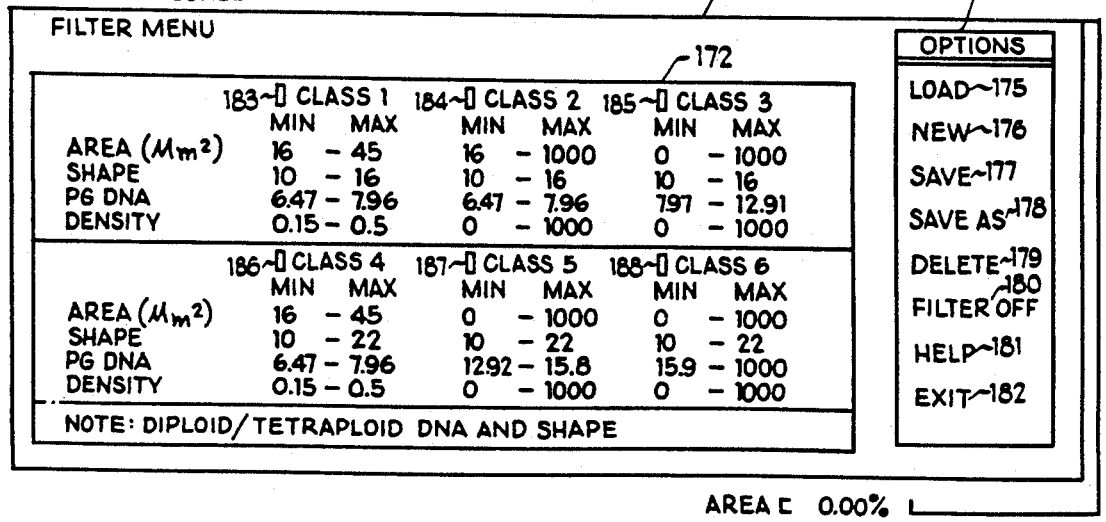
FIG. 14 is a representation of the filter menu screen shown during the set filter function of FIG. 8.

When the set filters function is requested, a filter menu 171 of FIG. 14 is displayed on the analysis screen of instruction monitor 52. The filter menu 171 includes an options field 170 and a filter parameter field 172. Options field 170 sets forth particular functions which can be performed in the set filters function and the parameters field 172 identifies the value ranges of four cell object attributes which are used to automatically place a given cell object into one of six classes identified as class 1 through class 6. When the filter menu is initially presented to the operator on monitor instruction 52, the four attribute value ranges under each class heading are all set to zero.

The options listed in the options field 170 are primarily used to establish ranges of values in the parameter field 172 and to define the use of those parameters. The "Load" option 175 permits the operator to specify the name of a pre-stored file of filter parameters which are read from memory and used to populate the filter parameter field 172. The "New" option 176 permits the operator to directly enter ranges of values into parameter option 172 for each cell object attribute in each class 1 through 6. The "Save" field 177 permits the saving of the values written into parameter field 172. The option "Save As" is similar to the option "Save" 177, except that the saved set of parameters can be given a particular name to aid in later recall. The "Delete" option 179 is used to delete all of the parameters entered in parameter field 172 and the "Filter Off" option 180 enables the use of the classify function 144 without any preassigned filter parameters. As in the previous screens, the "Help" function 181 provides user information and the "Exit" option 182 allows the user to return to the analysis menu 142.

The parameter field 172 includes filter definitions for each of six classes of cell objects. The filter for each cell object class comprises a range of values assigned to each of four cell object attributes listed below that class designation. The four attributes for each class are the area of optical entity in square micrometers, the shape of the optical entity, its DNA mass in picograms and the optical density of that optical entity. The shape factor in the value ranges is determined by dividing the square of the perimeter of the optical entity by the area of that entity Thus, a round shape has shape value of $4\pi$ and the value becomes larger the "less round" the measured object is.

The filter parameters placed in the class definition field 172 depend on the particular location from which the cell sample was taken e.g., breast and the particular type of cell sample e.g., tissue section The ranges of values shown in FIG. 14 have been found useful in the evaluation of prostate tissue section cell samples. With the values shown, class 1 identifies small diploid cell objects which are substantially round; class 2 identifies larger diploid cell objects which are also substantially round; class 3 identifies S phase cell objects which are of regular shape; class 4 identifies small diploid cell objects of a more irregular shape than class 1; class 5 identifies tetraploid cell objects; and class 6 identifies cell objects having large amounts of DNA.

After the filter values are established in function 150, the operator can move to the classify function 144 in which cell objects are automatically selected by the apparatus 10 in accordance with the established filter values. In the case where a cell object does not meet the filter ranges for any of the six classes (FIG. 14), the cell object is not selected for classification.

The flow chart of the classify function 144 is shown in FIG. 10. In the classify function, the digital image of a field of optical entities on slide 62 is analyzed by microprocessor 36 (FIG. 2). The digitized image is scanned (block 191) until an optical entity is found by the difference in contrast values between the entity and the image background. Microprocessor 36 then proceeds to the measure attribute step 193 where it identifies the perimeter of the found optical entity and counts both the number of pixels on the perimeter and the number of pixels within that perimeter to determine the perimeter and area of the entity found. Also, microprocessor 36 computes the DNA mass of the found optical entity from the previous calibration data and the density of the cell object and forms a sum of the optical density of the entity. After the attributes have been measured, an optical entity table (FIG. 11) is established for the optical entity and the measured attributes are stored in the entity table in step 195. The optical entity table for an entity includes its area, shape, class, DNA mass, optical density, perimeter length and location information. The location information of an entity consists of the X and Y coordinates of the field containing the entity, as determined from the X position sensor 68, the Y position sensor 66 and the X-Y board 60 and the horizontal and vertical maxima and minima of the entity perimeter as determined from the digital representation of the field. When the optical entity table is initially established for an entity, the class designation is set to 0 to indicate an unselected entity. The class designation for an entity which is assigned a class 1 through 6 is written into the entity table of that entity in later step 199.

After the optical entity attributes are accumulated and stored, they are compared (step 197) with the value ranges established in the filter setting function 150 (FIG. 9) in order to classify the entity. The optical entity attributes of an entity are compared to the six sets of filter ranges 1 through 6 in sequence. When the optical entity is found to be within a class, the entity is assigned to the found class and no further comparison with the ranges of other classes is undertaken. The following is an example of comparison for an optical entity having an area 80, shape 14, DNA mass 7.18 and density 0.4. The exemplary entity attributes will be first compared to ranges of class 1, where no match will be found because the entity area is too large. The entity attributes are next compared with the ranges of class 2 where a match is found. The entity is then assigned to class 2 and further comparisons with class ranges for this entity do not occur, even though this entity might fit into more than one class.

When the measured values of an entity do not fall within all of the ranges of values of any class, the entity is determined in step 198 to not be a useful diagnostic entity and the control program returns the find unmeasured entity step 191 to identify a new optical entity. Alternatively, when the measured attributes fall within all of the ranges of values of one of the classes 1 through 6, the identified class is stored (step 199) in the optical entity table (FIG. 11) of the found entity. After step 199, the flow proceeds to a block 321 to determine if DNA correction is needed. For the present example, the DNA correction, which is discussed below, is not needed and the program returns to block 191 to search for another optical entity.

When all of the optical entities in a field have been measured, no unmeasured object will be found in step 191 and flow proceeds to a review function 201. The review function 201 begins with the display (FIG. 12) on image monitor 30 of the optical field presently being reviewed. The displayed field is enhanced by drawing a line around each optical entity which was assigned one of the classes 1 through 6 (step 197, FIG. 10). The line around the perimeter is called perimeter enhancement and indicates that the included optical entity has been selected and classified. All non-selected optical entities in the field are displayed without perimeter enhancements.

The perimeter enhancement for a selected optical entity consists of a line around the selected optical entity, having a color which is uniquely associated with the class assigned to that optical entity. The association of classes 1 through 6 and colors is represented in FIG. 14 by a rectangle, e.g., 183 next to the designation of each class, e.g., class 1. In FIG. 14, rectangles 183 through 188 are shown in association with classes 1 through 6 respectively. The color of the rectangles 183 through 188 is described in Table 1.

TABLE 1

| Rectangle | Class | Color |
| --- | --- | --- |
| 183 | 1 (small diploid) | Light Blue |
| 184 | 2 (large diploid) | Red |
| 185 | 3 (S phase) | Green |
| 186 | 4 (irregular diploid) | Dark Blue |
| 187 | 5 (tetraploid) | Violet |
| 188 | 6 (massive DNA) | Yellow |

The encirclement of an optical entity by a colored line provides the operator with a direct indication of the class assigned to that optical entity, but does not obscure the optical entity from view.

Figure 12:
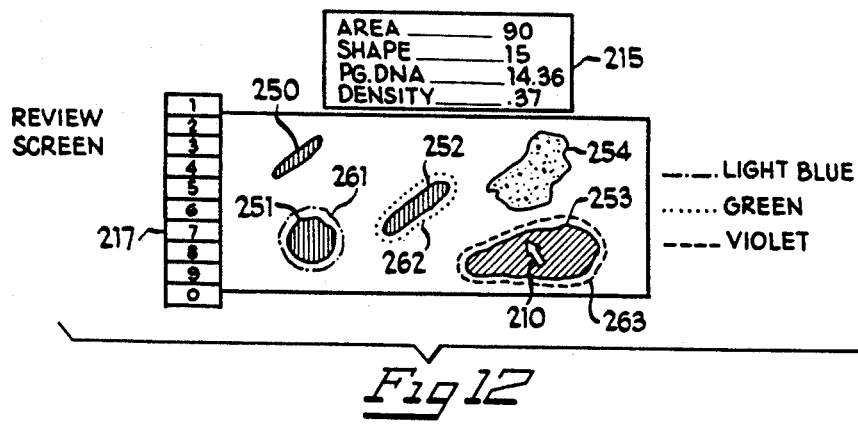
FIG. 12 is a representation of a video screen presented during the review function of FIG. 10.

The review image represented in FIG. 12 includes five optical entities 250 through 254 of which entities 250 and 254 do not have perimeter enhancements, while entities 251, 252 and 253 are encircled by perimeter enhancements 261, 262 and 263 respectively. For purposes of illustration, it is assumed that entity 250 is a cell object fragment having DNA mass of less than 6.47 picograms and that entity 254 has a DNA mass between 7.97 and 12.91 picograms, but is too irregular (shape greater than 16) to be an S phase cell. Thus, the entities 250 and 254 were not selected to be in a class and are not reproduced with enhanced perimeters. Entity 251 is produced on display 30 and represented in FIG. 12 with a light blue perimeter 261, (-.-.-.-) indicating a diploid cell object, entity 252 is produced with a green perimeter 262, (....) indicating an S phase cell object and entity 253 is produced with a violet perimeter 263, (----) indicating a tetraploid cell object. The cell objects and their enhanced perimeters are observed by the operator during the review function.

Figure 13:
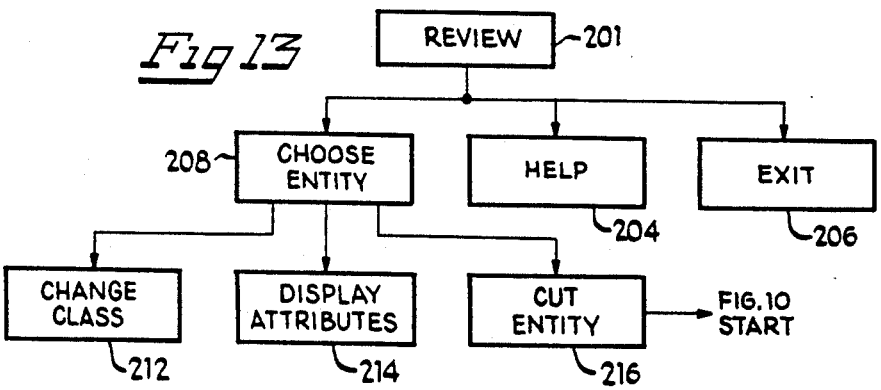
FIG. 13 is a representation of the menu screen presented during the performance of the review function.

The review function is an operator interactive operation, the menu for which is represented in FIG. 13. In the review function 201, the operator can select a help function 204 or an exit function 206 which are substantially similar to the previously described help and exit functions. Should the operator select the exit function 206, classifications assigned to the optical entities displayed (FIG. 12) are retained and the measured attributes of those selected entities will be used to produce final reports such as the DNA histogram. If the operator feels that further review of the field is desirable, he or she selects the "choose entity" function 208 which produces a mouse cursor 210 on the field viewing screen 30 represented in FIG. 12. By manipulation of mouse 20, the mouse cursor 210 is placed on an optical entity e.g., 253 (either previously classified or previously not classified) in question and that entity is chosen for review by depressing a key 21 on the mouse 20. When an entity is chosen its entity table (FIG. 11) is identified for use by comparing the X, Y position of the cursor 210 with the X and Y location information of optical entities as previously stored in the entity tables. After choosing an entity for review, the operator has three additional functions which can be selected. The display attributes function 214 produces on the review screen of FIG. 12, an attributes field 215 which displays the previously measured and stored attributes of the optical entity chosen for review. The attributes displayed in field 215 provide additional information to the operator on which decisions can be made.

Based on the viewed optical entity and the displayed attributes in field 215, the operator may wish to change the class to which the chosen entity was previously assigned. Change class function 212 is used to provide this change. The selection of the change class function 212 displays a numerical listing 217 (FIG. 12) of the numbers 1 through 0. The operator can place the mouse cursor 210 on any of the numbers 1 through 6 or 0 and press button 21 to enact a change of classification. Selecting one of the numbers 1 through 6 changes the classification of the chosen entity to the new class number. If the class number 0 is identified from the list 217, a 0 is written into the class location of the entity table. Upon a change of class the new class number (or zero) is stored in the associated entity table (FIG. 11) and, the colored perimeter of the selected entity is changed to a color representing the newly assigned class or is changed to a dark green indicating a deselected entity.

While in the choose entity function 208, the operator may observe two overlapped cell objects which appear to have been considered during automatic classification as a single optical entity. The operator can move the cursor to select such an entity. The cut entity function 216 can then be selected in which the operator, using known techniques, separates the selected optical entity into two parts for analysis purposes. After the cut entity function 216 the control program returns to the flow chart of FIG. 10 to reevaluate the cut entity as two entities in accordance with the operator's direction. At the conclusion of the reevaluation of the two new entities control returns to the review menus 201 in the choose function 208. The newly cut entity is then displayed, if appropriate, with enhanced perimeters around either portion of the entity.

At the conclusion of the choose entity function 208, the operator returns to the exit function 206 which transfers control back to the analysis menu 142 (FIG. 9). In the analysis menu, the operator can select the report function 160 to prepare reports such as a DNA histogram. The data for reports is read from the entity tables of the optical entities of the cell sample. Since each entity table includes a class designation identifying the class of the associated entity, the unselected entities (class=0) can readily be excluded from reports.

The previously described operations both simplify and accelerate the cell analysis operation by assisting an operator in the analysis process and automatically performing many of the routine portions of the analysis. Although difficult to quantify, the operator assistance provided by the present apparatus is believed also to improve the accuracy of final analysis and reporting. An additional capability, described below, directly improves the accuracy of final reports particularly DNA histogram reports when they result from an analysis of cells prepared from tissue sections.

A tissue section sample is made by "hardening" and "embedding" a tissue sample removed from a patient, perhaps by immersing the tissue sample in a fixative like formalin, and then by allowing it to be permeated by paraffin. To achieve a section, thin e.g., 5 micron slices are cut from the tissue mass. The act of cutting thin slices, which in many cases are thinner than the major dimensions of the cell objects to be observed, creates many cell object fragments.

Figure 15:
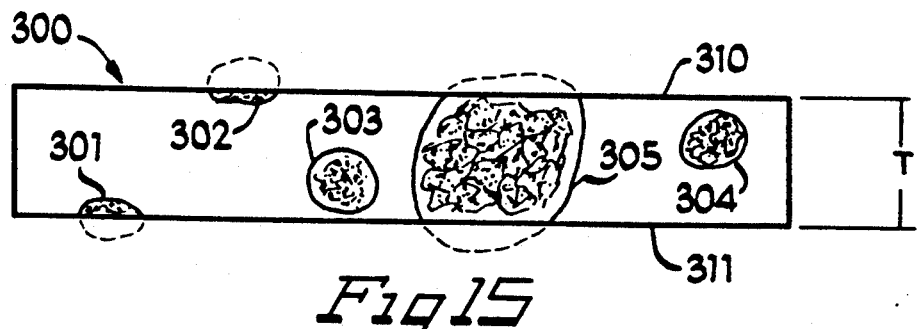
FIG. 15 is an edge view of a tissue section cell object sample.
Figure 16:
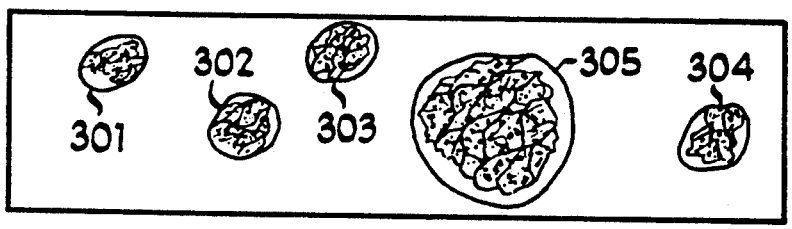
FIG. 16 is a top view of the tissue section sample of FIG. 15.

FIG. 15 is an edge view of a tissue section 300 of thickness T showing a plurality of cell objects 301 through 305. Tissue section 300 has a top surface 310 formed by one slicing operation and a bottom surface 311 formed by another slicing operation. FIG. 16 is a top view of the same tissue section which represents the view of FIG. 15 presented to analysis apparatus. In FIG. 15, the solid line cell objects and cell object fragments are those remaining for analysis and the dotted lines above and below surfaces 310 and 311 represent the portions of cell objects which have been sliced away by tissue sectioning. Cell objects 301 and 302 represent small fragments of relatively small cell objects. Cell objects 303 and 304 represent whole cell objects and cell object 305 represents a large cell object with relatively small top and bottom portions sliced away.

By presumption, fragments 301 and 302 will not be selected during analysis, since they are so small and lack sufficient density and DNA mass to match any of the filters of FIG. 14. Cell objects 303 and 304 are presumably whole diploid cell objects and will be selected by the automated process. Cell object fragment 305, which is assumed to represent a tetraploid cell, will be selected by the filters but its measured DNA mass value will be less than its unfragmented value. That is, the DNA content of the sliced away dotted line portions will not be included in its DNA mass. Thus, reporting fragment 305 as a whole cell object on the DNA mass histogram, will cause a point to appear with less mass than it should have.

For purposes of the following example, it is assumed that cell objects 303 and 304 have measured areas of 19 square microns and are selected as class 1 cell objects and that cell object 305 has a measured area of 50 square microns, a DNA mass of 11.7 picograms and will be selected as a class 3 cell object. The present embodiment includes methods for correcting the DNA mass values of cell object fragments, such as fragment 305 to more accurately represent their unfragmented DNA mass. Both the need for DNA mass correction, and the amount of correction is dependent on the thickness of the tissue section which was used to provide the cell sample being analyzed. The tissue section thickness is established in the apparatus by performing the set thickness function 146 of the analysis menu of FIG. 9. For the purposes of the present example, the tissue section 300 has a thickness T of 5 microns, so that the value 5 microns is entered in the set tissue thickness function 146.

Figure 17:
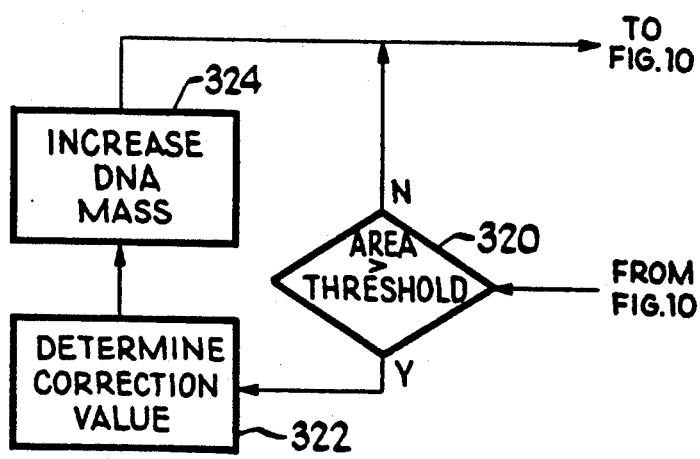
FIG. 17 is a flow diagram of a DNA mass correction function.

A flow diagram of the DNA mass correction operation is shown in FIG. 17 which is an adjunct to the classify flow diagram of FIG. 10. The classify function is performed as shown in FIG. 10 and when a cell object such as the cell object fragment 301 is not selected for classification, the flow proceeds from block 198 to block 191, as previously discussed. When a cell object is selected for classification, the assigned class is written into the entity table (FIG. 11) of that cell object and the flow proceeds to block 321 to determine if correction is to be invoked. When correction is to be invoked, flow proceeds to the correction function of FIG. 17. The correction function begins in block 320 (FIG. 17) where the measured area of the cell object is compared to a threshold value determined from the tissue section thickness. The threshold value is the area of a circle having a diameter equal to the tissue section thickness. For the 5 micron tissue section of the present example, threshold of block 320 is approximately 20 square microns. Block 320 is performed to identify large cell fragments such as cell object fragment 305, which need correction and to not identify for correction smaller whole cell objects such as 303, which do not need correction.

When whole cell object 303 (area=19 square microns) is being classified, step 320 determines that the threshold of 20 square microns is not exceeded and the flow proceeds to block 191 without correcting the DNA mass value of whole cell object 303. When cell object fragment 305 is classified, it will be placed in class 3 (see example assumptions) and block 320 will determine that the measured area (50 square microns) is larger than the 20 square micron threshold. A measured area greater than the threshold indicates that the entire cell object is unlikely to exist in the 5 micron thickness, and that DNA mass correction is needed. After a determination that the measured area of a cell object exceeds the threshold, a block 322 is performed to determine a correction value for the cell object. The correction value is determined from the measured area of the cell object and the thickness of the tissue section sample.

The correction value C is calculated from equation 1:

$$C = \frac{3T}{4R} - \frac{T^3}{16R^3} \qquad (1)$$

where T is the tissue section thickness and R equals the square root of the measured area divided by $\pi$. Given the 50 square micron measured area of cell object 305, R is approximately equal to 3.99 microns yielding a correction value C of 0.817. After the correction value is determined in block 322, the measured cell object mass is divided thereby in block 324 to increase the DNA mass to a corrected value. In the present embodiment, the measured mass of cell object 305 (11.7 picograms) is increased to 14.32 picograms in block 324. The corrected mass value, which more accurately represents the mass of cell object 305 before sectioning, is then recorded for use in the preparation of reports such as DNA histograms From block 324, the flow proceeds to block 191 (FIG. 10).

In the previous example of the correction function, a correction value was calculated for each cell object fragment identified to have an area greater than a predetermined threshold. The equation need not be performed for each identified cell object. Instead, the equation can be performed for many hypothetical combinations of tissue section thickness and measured cell object area and the results (the value C) stored in a look up table. This table can then be accessed directly from the tissue section thickness and cell object area to speed processing. Additionally, other methods for populating the correction value look up table could be used. For example, empirical data correlating measured cell object fragment area and the actual DNA mass of whole cell objects may be obtained from tests and used to populate the correction value look up table.

In the preceding example, cell objects were selected and assigned to classes before correction of DNA mass was performed. The DNA mass correction of FIG. 17 could have been performed before selection. In such a case, the function performed by FIG. 17 could be entered after block 195 (FIG. 10) with a return from the correction function to block 197. In this way, classes would be assigned to identified cell objects on the basis of corrected cell object mass values. Some cell evaluation systems measure DNA in relative terms and assign cell objects a relative DNA index value. The present invention can be used to correct any DNA mass measurement value, be it specific mass in picograms or a relative mass value such as a DNA index value.

While a preferred embodiment of the invention has been illustrated, it will be obvious to those skilled in the art that various modifications and changes may be made thereto without departing from the scope of the invention as defined in the appended claims.

What is claimed is:

1. In an image analysis apparatus, a method of analyzing nuclei fragments and whole nuclei of cell objects in a cut tissue and assigning selected whole nuclei into individual classes of a plurality of mutually exclusive classes, said method comprising:

automatically measuring by said image analysis apparatus a plurality of cell object attributes of each of said cell objects;

assigning, by said image analysis apparatus in response to said measuring step, one of said mutually exclusive classes to selected ones of said whole nuclei;

displaying a representation of a plurality of said selected whole nuclei substantially simultaneously with indicia of its respective class assigned thereto; and enabling, after the commencement of the displaying step, an operator to change the class assigned to any of said displayed whole nuclei.

2. The method of claim 1 comprising the step of changing, after said enabling step, the class assigned to at least one of said whole nuclei.

3. The method of claim 1 wherein said cell sample comprises whole cell nuclei and nuclei fragments, and said assigning step comprises identifying said nuclei fragments and assigning classes only to said whole cell nuclei.

4. The method of claim 1 comprising:

establishing for each of said mutually exclusive classes a range of values for predetermined ones of said measured attributes before said assigning step; and said assigning step comprises comparing the attributes measured for each of said whole nuclei with the ranges of values established in said establishing step.

5. The method of claim 1 wherein said displaying step comprises displaying representations of a plurality of said selected cell objects substantially simultaneously, said plurality including cell objects assigned to at least two of said plurality of classes, wherein each displayed cell object is displayed in association with indicia of the class assigned thereto.

6. The method of claim 1 wherein said automatic measuring step comprises:

forming an image of said plurality of cell objects;
   digitizing said formed image; and
   determining values for said measured attributes from said digitized image.

7. The method of claim 6 comprising storing said digitized image and storing the values of said measured cell object attributes.

8. The method of claim 1 wherein said displaying step comprises visually displaying a representation of each of said whole nuclei on a video monitor, and displaying on said video monitor in association with each of said displayed whole nuclei, visual indicia of the class assigned thereto.

9. The method of claim 8 comprising:

choosing, by operator interaction with said apparatus, one of the whole nuclei displayed on said video monitor; and displaying predetermined ones of the plurality of measured whole nuclei attributes for the chosen cell object.

10. The method of claim 9 comprising changing the class assigned to the chosen whole nuclei after the enabling step.

11. The method of claim 8 wherein a unique color is associated with each of said mutually exclusive classes, said indicia displaying step comprises displaying colored perimeters around said displayed whole nuclei each colored perimeter being of the unique color associated with the one of said classes assigned to the whole nuclei enclosed thereby.

12. The method of claim 11 comprising changing, after the enabling step, the class assigned to at least one of said displayed whole nuclei and changing the unique color of the perimeter of said at least one whole nuclei in response to the class changing step.

13. A method of analyzing a tissue section in an automatic analyzing apparatus with image analysis, said method comprising:
providing a cell sample comprising whole nuclei and cell nuclei fragments caused by slicing the tissue section for analysis;
automatically measuring, by said apparatus, attributes of nuclei fragments of said cell sample;
automatically comparing, by said apparatus, said measured attributes to predetermined parameters distinctive of whole nuclei from the tissue section; and
reporting, by said apparatus in response to said comparing step, said measured attributes of only said whole nuclei in said cell sample included in said report, and excluding from said report measured attributes of said nuclei fragments.

14. A method of analyzing by an image analysis apparatus a cut tissue sample comprising a disordered collection of cell objects in said cut tissue sample having whole nuclei and nuclei fragments of cells therein, said method comprising:
forming an optical image of said cut tissue sample;
identifying a plurality of optical entities in said optical image, each entity having a single common boundary;
automatically measuring a plurality of attributes including DNA mass of each optical entity identified in the identifying step;
selecting in response to said attribute measuring step, ones of said optical entities representing whole nuclei;
displaying said optical image of said cut tissue sample; and
displaying indicia of selection in association with each whole nuclei selected in said selecting step.

15. The method of claim 14 comprising:
establishing prior to said selecting step, a plurality of attribute value ranges indicative of single whole nuclei; and
said selecting step comprises comparing the attributes measured for each of said optical entities with the ranges of values established in the establishing step.

16. The method of claim 14 comprising generating after said measuring step a DNA histogram showing the relative occurrence of selected whole nuclei having predetermined DNA mass attributes.

17. The method of claim 14 comprising enabling the removal, by operator interaction with said apparatus, of the displayed indicia of selection associated with each of said selected optical entities.

18. The method of claim 17 comprising generating, after said removal enabling step, a DNA histogram showing the relative occurrence of whole nuclei associated with indicia of selection.

19. The method of claim 14 comprising assigning one of a plurality of mutually exclusive whole nuclei classes to each optical entity selected in said selecting step and said indicia displaying step comprises displaying in association with each of said selected entities, indicia of the class assigned thereto in said assigning step.

20. The method of claim 19 comprising enabling an operator to change the class assigned by said apparatus to any of said displayed optical entities.

21. A method of analyzing, by an image analysis apparatus, a cut tissue sample comprising a plurality of cell objects having whole nuclei and nuclei fragments for a suspected cancer, said method comprising:
storing in the image analysis apparatus a plurality of ranges of cell object attribute values for identifying cell objects having cancer analysis value;
automatically measuring, by said analysis apparatus, a plurality of cell object attributes, including cell object DNA mass, of each of said whole nuclei and nuclei fragments;
comparing said stored ranges of attribute values with said automatically measured cell object attributes for said whole nuclei;
automatically selecting, responsive to said comparing step, ones of said objects having whole nuclei and cancer analysis value; and
reporting a DNA histogram representing the numbers of whole nuclei selected in said selecting step having DNA masses in predetermined ranges.

22. The method of claim 21 comprising displaying said plurality of cell objects and enabling an operator to reclassify automatically whole nuclei selected in said selecting step to be unselected cell objects and to reclassify automatically unselected cell objects to be whole nuclei selected in said selecting step.

23. An image analysis apparatus for analyzing nuclei fragments and whole nuclei of cell objects in a cut tissue sample and assigning selected whole nuclei into one of a plurality of mutually exclusive classes, comprising:
means for measuring a plurality of cell object attributes of each of said cell objects;
means, responsive to said measuring means, for assigning one of a plurality of mutually exclusive classes to selected ones of said whole nuclei;
means for displaying a representation of each of said whole nuclei substantially simultaneously with indicia of its respective class assigned thereto by said assigning means; and
means responsive to operator interaction for changing the class assigned to any of said displayed whole nuclei.

24. The apparatus of claim 23 wherein said measuring means comprises:
means forming an image of said plurality of cell objects;
means for digitizing said formed image; and
means for determining values for said measured attributes from said digitized image.

25. A method of automating production of a report by an image analysis apparatus of a cut tissue sample comprising a plurality of cell objects including whole nuclei and nuclei fragments, said method comprising:

forming an image of said cell objects;

automatically measuring, by said image apparatus, morphological attributes of said cell objects in said image;

storing in said apparatus said measured attributes for each of said cell objects;

displaying on said apparatus said cell objects of said image to an operator;

displaying on said apparatus the measured attributes of at least one cell nuclei in association with said at least one cell nuclei, the attributes of each of said at least one cell nuclei being separately displayed from the attributes of other ones of said at least one cell nuclei; and generating by said apparatus a report including said measured attributes of selected whole nuclei, said selected whole nuclei being selected for inclusion in the report after said attribute displaying step.

26. The method of claim 25 wherein said displaying measured attributes step comprises:

choosing by said operator at least one of said displayed cell nuclei;

reading the stored measured attributes of said chosen cell nuclei from said apparatus; and displaying predetermined ones of the measured attributes read in said reading step.

27. The method of claim 25 wherein said cell sample comprises a first cell object having attributes desirable for said report and a second cell object having attributes not desirable for said report, said displaying attributes step comprises:

displaying the measured attributes of said first cell object in association with said first cell object and displaying the measured attributes of said second cell object in association with said second cell object; and said method comprises selecting by an operator said first cell object for inclusion in said report and not selecting said second cell object for inclusion in said report.

* * * * *

UNITED STATES PATENT AND TRADEMARK OFFICE
CERTIFICATE OF CORRECTION

PATENT NO. : 5,235,522
DATED : August 10, 1993
INVENTOR(S) : Bacus

It is certified that error appears in the above-indentified patent and that said Letters Patent is hereby corrected as shown below:

Column 3, line 24, change "judgement" to --judgment--.

Column 5, line 22, change "analyze" to --analyzed--.

Column 5, line 56, change "Preferred Embodiment" to --preferred embodiment--.

Column 7, line 3, after "object" insert a period.

Column 7, line 51, change "42" to --40--.

Column 7, line 52, change "40" to --42--.

Column 9, line 10, delete "An analysis" and insert --The--.

Column 9, line 12, delete "The" and insert --An analysis--.

Column 9, line 13, change "analysis" to --analyze--.

Column 9, line 16, change "analyze" to --analysis--.

Column 9, line 43, after "objects" insert a period.

Column 10, line 5, change "option" to --field--.

Column 10, line 6, change "field" to --option--.

Column 10, line 28, after "entity" insert a period.

UNITED STATES PATENT AND TRADEMARK OFFICE
CERTIFICATE OF CORRECTION

PATENT NO. : 5,235,522
DATED : August 10, 1993
INVENTOR(S) : Bacus

It is certified that error appears in the above-indentified patent and that said Letters Patent is hereby corrected as shown below:

Column 10, line 34, after "section" insert a period.

Column 15, line 39, after "histograms" insert a period.

Signed and Sealed this

Third Day of May, 1994

BRUCE LEHMAN

Attest:

Attesting Officer

Commissioner of Patents and Trademarks